(12) United States Patent
Xie et al.

(10) Patent No.: US 8,346,259 B2
(45) Date of Patent: Jan. 1, 2013

(54) METHOD FOR HAND-OVER OF TERMINAL, NETWORK ELEMENT, BASE STATION, AND COMMUNICATION SYSTEM

(75) Inventors: Hairong Xie, Shanghai (CN); Yujun He, Shanghai (CN); Steven Shio, Shanghai (CN)

(73) Assignee: Alcatel Lucent, Paris (FR)

( * ) Notice: Subject to any disclaimer, the term of this patent is extended or adjusted under 35 U.S.C. 154(b) by 116 days.

(21) Appl. No.: 12/678,464

(22) PCT Filed: Sep. 19, 2007

(86) PCT No.: PCT/CN2007/002758
§ 371 (c)(1),
(2), (4) Date: Mar. 16, 2010

(87) PCT Pub. No.: WO2009/036596
PCT Pub. Date: Mar. 26, 2009

(65) Prior Publication Data
US 2010/0291930 A1 Nov. 18, 2010

(51) Int. Cl.
*H04W 36/00* (2009.01)
(52) U.S. Cl. .................................. 455/436; 455/552.1
(58) Field of Classification Search .......... 455/436–439, 455/115.1, 115.3, 132, 134, 435.2, 552.1; 370/320, 331–332, 335
See application file for complete search history.

(56) References Cited

U.S. PATENT DOCUMENTS

| | | | |
|---|---|---|---|
| 7,720,482 B2* | 5/2010 | Chaudry et al. | 455/442 |
| 7,843,892 B2* | 11/2010 | Mehrabanzad et al. | 370/342 |
| 2002/0196755 A1 | 12/2002 | Hidaka et al. | |
| 2007/0026860 A1* | 2/2007 | Okamoto | 455/436 |
| 2007/0064648 A1 | 3/2007 | Kim et al. | |
| 2007/0072563 A1* | 3/2007 | Weaver | 455/115.1 |
| 2007/0104161 A1* | 5/2007 | Hossain et al. | 370/338 |
| 2007/0161399 A1* | 7/2007 | Hata | 455/550.1 |
| 2007/0191044 A1* | 8/2007 | Kostic et al. | 455/522 |

FOREIGN PATENT DOCUMENTS

| | | |
|---|---|---|
| JP | 2006-180413 A | 7/2006 |
| KR | 2006-0099816 A | 9/2006 |

OTHER PUBLICATIONS

International Search Report.

* cited by examiner

*Primary Examiner* — Cong Tran
(74) *Attorney, Agent, or Firm* — Fay Sharpe LLP (57) ABSTRACT

The invention provides a method for hand-over of a terminal from a first base station to a second base station, radio network element, terminal, base station and a communication system. The method for hand-over of a terminal from a first base station to a second base station, wherein said first base station is EV-DO enabled in an access network and said second base station is not EV-DO enabled, said method comprising: transmitting an EV-DO pilot signal from said second base station to said terminal; sending a route update message including an EV-DO pilot strength from said terminal if said EV-DO pilot strength is above a predetermined threshold; calculating a CDMA pilot strength based on said EV-DO pilot strength; and performing the hand-over of said terminal to said second base station when CDMA pilot strength is above the hand-over threshold.

25 Claims, 7 Drawing Sheets

METHOD FOR HAND-OVER OF TERMINAL, NETWORK ELEMENT, BASE STATION, AND COMMUNICATION SYSTEM

TECHNICAL FIELD OF THE INVENTION

The present invention relates to radio communication, in particular, to method for hand-over of a terminal, network controller element, terminal, base station, and communication system.

BACKGROUND OF THE INVENTION

CDMA 2000 1x is a version of CDMA 2000, which utilizes both circuit networks and packet networks and provides voice service and low-rate data services with a maximum transmission data rate of 307.2 Kbps. CDMA 2000 1xEV-DO is a data-optimized evolution of the CDMA2000 1x standard with High Rate Packet Data (HRPD) technology, which is dedicated for a packet network to transmit only data and provides bi-directional high-rate data services with a maximum transmission rate of 2.4 Mbps. Its evolution of EV-DO RevA has the maximum forward link data rate of 3.07 Mbps and maximum reverse link data rate of 1.8 Mbps. Moreover, EV-DO RevA has the capability to support VoIP service. By time-dividing radio channel into separate pilot, MAC and data channels, EV-DO, which uses a 1.25 MHz data channel, improves spectrum efficiency and eliminates the interference increase that voice traffic would cause data speed to drop.

Hereinafter, the CDMA 2000 1x system is simply referred to as "1x system" or "CDMA system" and the CDMA 2000 1xEV-DO RevA system is simply referred to as "EV-DO system" for the convenience of explanation.

Currently, the EV-DO network has generally been used together with the conventional 1x network. More specifically, the EV-DO network may only cover some cities, or hot spots, whereas the conventional 1x network covers almost everywhere to form a seamless radio data network. Thus, the handoff from VoIP in EV-DO system to 1x circuit voice becomes very important for keeping the voice call continuity.

The existing hand-over from 1xEV-DO to 1x system is related to Circuit Services Notification Application (CSNA). CSNA has been introduced in the EV-DO system to address operation of an Access Terminal/Mobile Station (AT/MS) that otherwise would have to periodically retune to the 1x system to check for pages while it is monitoring the EV-DO system. For CSNA, the AT (a device providing data connectivity to a user, which is equivalent to a mobile station in 1x systems.) and the AN (Access Network, a logical entity in the Radio Access Network (RAN) used for radio communications with AT.) implement a filtering mechanism to allow notifications associated with certain services to be tunneled between 1x and EV-DO systems.

The handoff procedure from 1xEV-DO to 1x system defined in 3GPP2 A.S0008-B as follows:
(1) AN receives a Route Update Message (RUM) for reporting the current link status including the pilot strength, pilot phase of each pilot in active set and neighbor set from an AT/MS, and finds the current pilot strength (Ec/Io) for the EV-DO cell is lower than a predetermined threshold and cannot maintain the VoIP service quality.
(2) AN sends the 1X overhead messages to AT/MS through CSNA protocol.
(3) AN sends the 1X service redirection message to AT/MS through CSNA protocol. This will indicate the AT/MS to begin the procedure to move the call from VoIP of 1xEV-DO to circuit voice of 1X.
(4) AT/MS send the 1X origination to AN through CSNA.
(5) AN sends the handoff direction message to MS/AT.
(6) MS/AT tunes to 1X channel to continue the call.

Whereas 1x pilot is transmitted continuously, the EV-DO pilot burst has 96 chips duration with only one pilot burst for each half slot. Consequently, the RUM sent by the AT in EV-DO system only includes EV-DO pilots in current system. Thus, the pilot measurement for the 1X system is not performed and the AN cannot know clearly what is the CDMA candidate in fact.

Compared to a current handoff procedure, the VoIP to 1X circuit voice handoff has no pre-provisioning candidates to perform its blind handoff. Therefore, the AN has to determine the active set of 1X system based on the 1X sector information provided by the CSNA protocol during the handoff procedure. The AN will get the 1X neighbor list and sort the list based on the number of occurrence in the overhead messages. Then the 6 pilots of the font candidates of the list becomes the active set of the 1X system.

Since the generated handoff candidates are based on the possibilities of occurrence in the overhead message, and not on the real measurement, the successful handoff cannot be assured. Actually this process cannot tell which CDMA cells have the best coverage for the AT, and it is possible that a CDMA cell has the good coverage but is missed because only 6 pilots are allowed in the active set. Thus the call drop may happen during the handoff.

In addition, another issue for the current system is the "Near-Far Interference" between the border of EV-DO system and 1x system. The EV-DO system is time divided system in the forward link. And the pilot channel transmission is synchronized for the whole system, thus a pilot signal from the neighbor EV-DO cell is the main interference for the EV-DO system. When a cell is a border cell of the EV-DO system, the pilot strength thereof may be near 0 dB since there is no interference of neighbor cell. Therefore the AT in the border EV-DO cell can maintain the link further than in the normal EV-DO cell. Thus there is the possibility that the AT eventually is very near to the CDMA cell when it tries to maintain the long EV-DO traffic link. Then the transmitter of the AT may cause an interference with the reverse link of the CDMA cell, which is called the "Near-Far Interference between EV-DO and CDMA". It potentially may decrease the CDMA cell's capacity. Of cause, the interference effects are a function of the spectral location of CDMA and EV-DO carriers, for example, the worst interference impact comes from the EV-DO channel spectrally adjacent to a CDMA channel.

SUMMARY OF THE INVENTION

To solve the above problem in the prior art, the invention provides a method for hand-over of a terminal from a first base station to a second base station, a network element, a hybrid terminal, a device, base station and a communication system.

According to one aspect of the invention, there is provided a method for hand-over of a terminal from a first base station to a second base station, wherein said first base station is EV-DO enabled in an access network and said second base station is not EV-DO enabled, said method comprising: transmitting an EV-DO pilot signal from said second base station to said terminal; sending a route update message including an EV-DO pilot strength from said terminal if said EV-DO pilot strength is above a predetermined threshold; calculating a CDMA pilot strength based on said EV-DO pilot strength; and performing the hand-over of said terminal to said second base station when said CDMA pilot strength is above the hand-over threshold.

According to another aspect of the invention, there is provided a network element for controlling hand-over from a first base station to a second base station, wherein said first base station is EV-DO enabled in an access network and said second base station is not EV-DO enabled, comprising: calculating unit configured to calculate a CDMA pilot strength based on an EV-DO pilot strength of said second base station; determining unit configured to determine whether said CDMA pilot strength is above a hand-over threshold; and performing unit configured to perform the hand-over of a terminal from said first base station to said second base station when said CDMA pilot strength is above the hand-over threshold.

According to still another aspect of the invention, there is provided a hybrid terminal for use in a CDMA system and an EV-DO system, wherein said hybrid terminal is configured to receive an EV-DO pilot signal from said CDMA system.

According to still another aspect of the invention, there is provided a device for generating a pilot signal, which is to be equipped with a non-EV-DO enabled base station in a CDMA system, wherein said device is configured to generating a EV-DO pilot signal.

According to still another aspect of the invention, there is provided a base station in a CDMA system, which is not EV-DO enabled, comprising the above-described device for generating a pilot signal.

According to still another aspect of the invention, there is provided a communication system, comprising: the above-described hybrid terminal, the above-described base station in CDMA system, and the above-described network element for controlling hand-over.

BRIEF DESCRIPTION OF THE DRAWINGS

It is believed that the purposes, features and advantages of the present invention will be better understood from the following description of the detailed implementation of the present invention taken in conjunction with the accompanying drawings, in which.

DETAILED DESCRIPTION OF EMBODIMENTS OF THE INVENTION

Next, various embodiments of the present invention will be described in detail in conjunction with accompany drawings.

Figure 1:
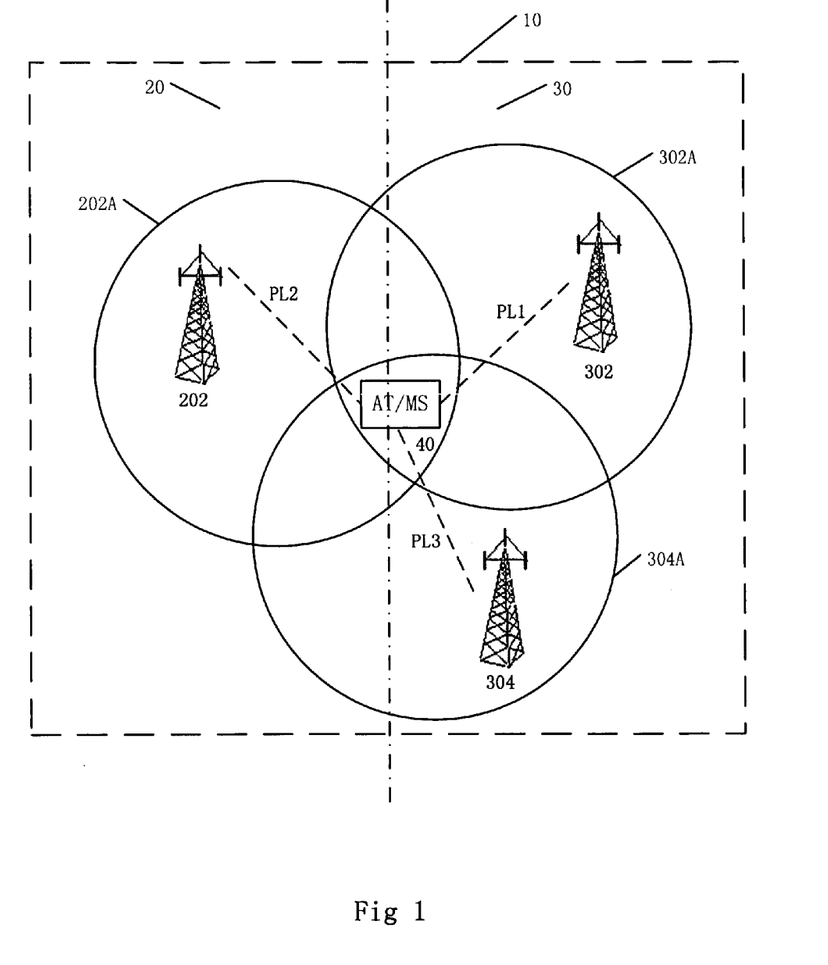
FIG. 1 shows a schematic block diagram of the communication system according to an embodiment of the present invention.

FIG. 1 shows a schematic block diagram of the communication system according to an embodiment of the present invention.

As shown in FIG. 1, the communication system 10 comprises CDMA system 20, EV-DO system 30 and an AT/MS 40. For the convenience of description, 1x system 20 includes only one base station (BS) 202 with B cell 202A 1x only enabled, and the EV-DO system 30 includes Access Network (AN) 302 with A cell 302A of combined 1x and EV-DO RevA, and AN 304 with C cell 304A of combined 1x and EV-DO Rev0. VoIP call is supported in cell 302A, while is not in cell 304A. And those skilled in the art may appreciate that these systems may include more than one base station and AN in fact.

AN 302 comprises a network controller element 306 which may control hand-over from an EV-DO system to a 1x system.

Figure 2:
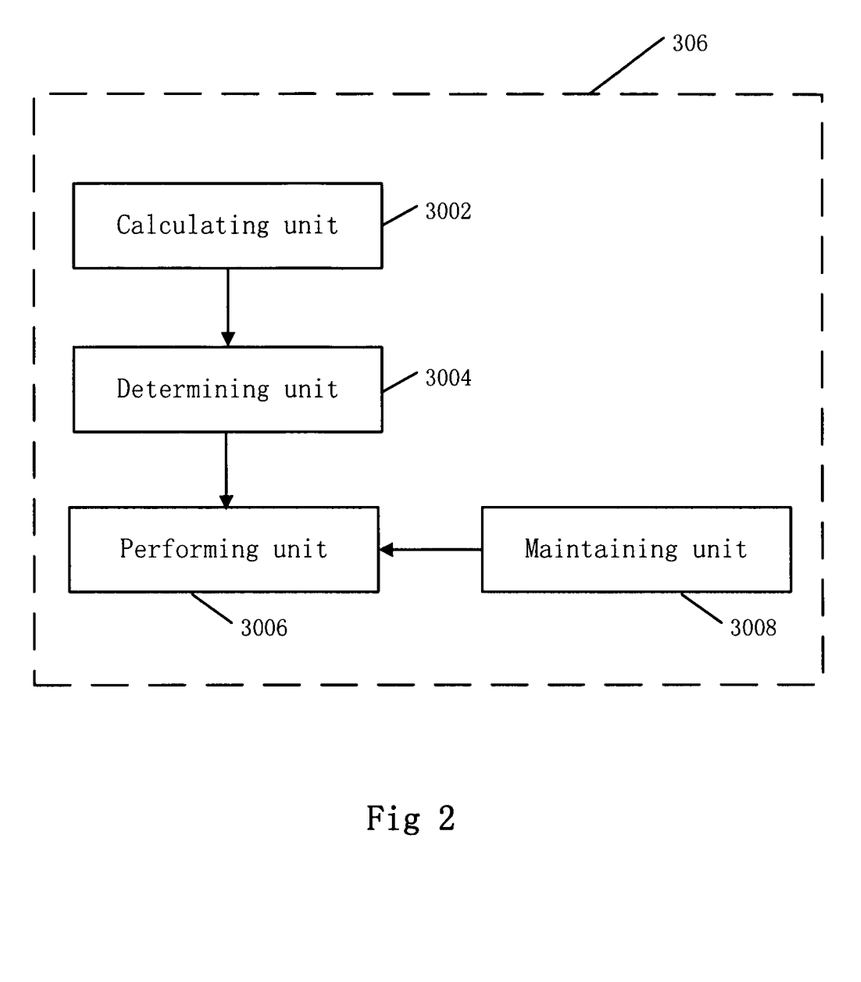
FIG. 2 shows a schematic block diagram of the network element according to another embodiment of the present invention.

FIG. 2 shows a schematic block diagram of the network controller element according to an embodiment of the present invention.

Referring to FIG. 2, the network controller element 306 comprises calculating unit 3002, for calculating a CDMA pilot strength of a CDMA cell based on its EV-DO pilot strength; determining unit 3004, for determining whether the CDMA pilot strength is above a hand-over threshold or not; and performing unit 3006, for performing the hand-over of a terminal from the EV-DO system to the 1x system when the CDMA pilot strength is above the hand-over threshold. In addition, the network controller element 306 further comprises maintaining unit 3008, for maintaining a pilot PN mapping table for the 1x and EV-DO system for the same CDMA cell site.

Figure 3:
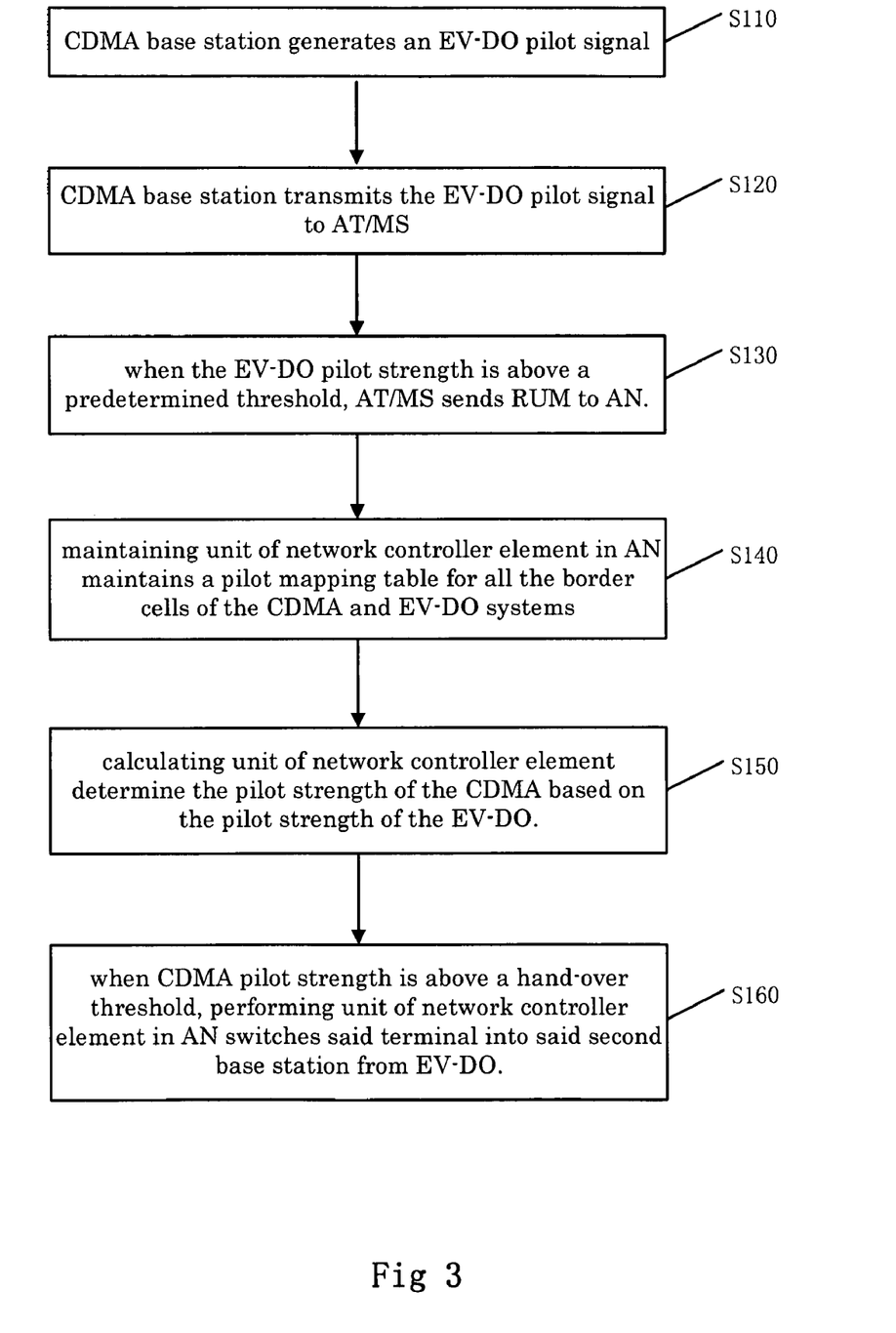
FIG. 3 shows a flow chart of the method for hand-over from EV-DO system to 1x system according to another embodiment of the present invention.

FIG. 3 shows a flow chart of the method for hand-over from EV-DO system to 1x system according to an embodiment of the present invention.

As shown in FIG. 3, in the step S110, the CDMA base station 202 at the border of CDMA and EV-DO coverage can generate an EV-DO pilot signal, and transmit the EV-DO pilot signal to an AT/MS 40 in the step S120. And the power of the pilot is the same as the other normal EV-DO cell's power. It is the basis on which reliable handoff can be performed. That is, AN 302 may know that there exists a CDMA cell through EV-DO pilot transmitted from 1x cell 202A.

In a subsequent step S130, when the EV-DO pilot strength is above a predetermined threshold, the AT/MS 40 sends Route Update Message (RUM) to the AN 302. RUM contains an EV-DO pilot strength concerning 1x cell 202A, thus AT/MS 40 can trigger a reliable handoff by means of measuring EV-DO pilot and comparing its strength with a predetermined threshold.

Next, in the step S140, maintaining unit 3008 of network controller element 306 in EV-DO network may maintain a pilot mapping table for all the border cells of the CDMA and DO systems, such as cell 202A. The pilot mapping table includes at least, e.g. pseudo noise (PN) code, a pilot code of CDMA and of EV-DO for each border cell.

For the CDMA only cell 202A, it may transmit an EV-DO pilot. As shown in Table 1, individual cell in the border of EV-DO system and 1x system has both the CDMA pilot PN and EV-DO pilot PN.

TABLE 1

Pilot Mapping table for CDMA and EV-DO

| Cell Number | CDMA Pilot PN | EV-DO Pilot PN |
|---|---|---|
| 1 | $PN_{1X,1}$ | $PN_{DO,1}$ |
| 2 | $PN_{1X,2}$ | $PN_{DO,2}$ |
| ... | ... | ... |
| n | $PN_{1X,n}$ | $PN_{DO,n}$ |

In step S150, calculating unit 3002 of network controller element 306 may use the new algorithm to determine the pilot strength of the CDMA cell 202A based on the EV-DO pilot strength thereof. Therefore, the AN 302 may determine whether a handoff from EV-DO to CDMA will happen or not. The proposed algorithm is described in more detail in below.

Referring to FIG. 1, there are 3 cells in the system 10: cell A302A, cell B202A and cell C304A. The system capability can be described in the table below:

TABLE 2

Border cells' Configuration Table

| Cell | 1X Capability | EV-DO Capability | VoIP Capability |
|---|---|---|---|
| Cell 302A | Yes | DO RevA | Yes |
| Cell 202A | Yes | DO pilot only | No |
| Cell 304A | Yes | DO Rev0 | No |

It is assumed that the path loss from each cell to AT/MS 40 is PL1, PL2, and PL3 (PLi<1) respectively, and that the CDMA carrier and EV-DO carrier are the same band.

If the transmit power for EV-DO is P Watts, then the pilot strength for cell A302A can be expressed mathematically:

$$(Ec/Io)_{A,DO} = \frac{P*PL1}{P*PL1 + P*PL2 + P*PL3 + F*N_{th}*BW} \quad (1)$$

Here, F is the noise factor of the EV-DO cell,
$N_{th}$ is thermal noise spectrum density,
BW is a bandwidth (1.23 or 1.25 mHz),
Ec/Io is the ratio of the combined pilot energy per chip Ec, to the total received power spectrum density (noise and signals) Io.

Since the thermal noise is relatively small compare to the signal and interference, the EV-DO pilot strength can also be:

$$(Ec/Io)_{A,DO} = \frac{P*PL1}{P*PL1 + P*PL2 + P*PL3}; \quad (2)$$

The EV-DO and CDMA are assumed to use the same band, thus the propagation modes are the same. For example, in 3GPP2 "CDMA2000 Evaluation Methodology", there is a propagation mode defined for 1.9 GHz as follows:

The PathLoss=28.6+35 log 10(d) dB, d in meters.

(Bts Ant Ht=32M, Ms=1.5M)

Accordingly, the path loss for EV-DO and CDMA may be considered the same, since the distance and RF environment for CDMA and EV-DO are the same.

Firstly considering the EV-DO coverage for the system 10 as shown in FIG. 1, and the pilot in EV-DO being transmitted in full power P Watts, assume the AT carries the VoIP call in cell A 302A coverage moving towards cell B 202A. The pilot strength for cell B 202A seen by AT is:

$$(Ec/Io)_{B,DO} = \frac{P*PL2}{P*PL1 + P*PL2 + P*PL3} = \frac{PL2}{PL1 + PL2 + PL3} \quad (3)$$

And the pilot strength for cell C 304A is:

$$(Ec/Io)_{C,DO} = \frac{PL2}{PL1 + PL2 + PL3} \quad (4)$$

Secondly considering for the CDMA coverage, assume:

(1) Call loads factor for cell A, B and C are β1, β2 and β3 (0≤βi<1) respectively;

(2) "f" is the fraction for the pilot power to the CDMA cell's maximum transmitter power, and generally within the scope from 15% to 20%;

(3) $P_{OH}$ is the power of the overhead channel of the CDMA cell 202A;

(4) $P_T$ is the total traffic power available for the CDMA cell 202A; and (5) Thermal noise for CDMA (−108 dBm) is neglected compared to the signal and interference.

Referring to FIG. 1, the CDMA pilot strength for cell B 202A is:

$$(Ec/IO)_{B,1X} = \frac{PilotPower}{SignalPower + \text{Interference}} \quad (5)$$
$$= \frac{f*(P_{OH} + P_T)*PL2}{\sum_i (P_{OH} + \beta i*P_T)*PLi};$$

And also the pilot strength for cell C is:

$$(Ec/Io)_{C,1X} = \frac{f*(P_{OH} + P_T)*PL3}{\sum_i (P_{OH} + \beta i*P_T)*PLi} \quad (6)$$

If the pilot strength in EV-DO system has the relationship blow:

$$(Ec/Io)_{B,DO} > (Ec/Io)_{C,DO},$$

then the result PL2>PL3 can be obtained according to equation (3) and (4).

Therefore we can obtain as follows according to equation (5) and (6):

$$(Ec/IO)_{B,1X} > (Ec/Io)_{C,1X}$$

That is to say, if the neighbor lists for both CDMA and EV-DO is sorted according to the pilot strength, the sequences are the same for CDMA and EV-DO. More specifically, the strong pilot in EV-DO system also means a strong pilot in CDMA system, and vice versa.

And also it is found that there is the further relationship between pilot strength for CDMA and EV-DO for the same sector.

The recommended handoff thresholds for CDMA and EV-DO are as follows:

TABLE 3

| System type | T_ADD (PilotAdd for DO) | T_Drop (PilotDrop for DO) |
|---|---|---|
| | Recommended Handoff Threshold | |
| CDMA | −13 dB | −15 dB |
| EV-DO | −7 dB | −9 dB |

Taking the cell B 202A as the example:

$$(Ec/I0)_{B,1X} = \frac{f*(P_{OH}+P_T)*PL2}{\sum_i (P_{OH}+\beta i*P_T)*PLi} > \frac{f*(P_{OH}+P_T)*PL2}{\sum_i \left(\frac{P_{OH}+}{\beta max*P_T}\right)*PLi} =$$

$$\frac{f*(P_{OH}+P_T)*PL2}{(P_{OH}+\beta max*P_T)*(PL1+PL2+PL3)}$$

Here βmax is the maximum call load factor for cell A 302A, B 202A and C 304A. From the equation (3), we can get:

$$(Ec/I0)_{B,1X} > \frac{f*(P_{OH}+P_T)}{P_{OH}+\beta max*P_T} *(Ec/Io)_{B,DO} \quad (7)$$

Here, $$\frac{f*(P_{OH}+P_T)}{P_{OH}+\beta max*P_T}$$

actually represents the minimum ratio of a pilot power to overall power at antenna port in CDMA cell 202A. Thus, the CDMA pilot strength $(Ec/I0)_{B,1X}$ can be estimated based on the EV-DO pilot measurement.

For example, if:
(1) βmax=0.5 with all the cells being half loaded;
(2) $P_{OH}$ is 22% of the total power; and f=15%,
then $$((Ec/I0)_{B,1X})_{dB} > 10*\log10\left(\frac{0.15}{0.22+0.5*(1-0.22)}\right) + ((Ec/Io)_{B,DO})_{dB}.$$

So, $((Ec/I0)_{B,1X})_{dB} > ((Ec/Io)_{B,DO})_{dB} - 6$ dB.

Consequently, if the Route Update Message sent from AT/MS 40 includes a EV-DO pilot with the pilot strength −9 dB, it also indicates that the CDMA pilot strength is −15 dB for the same sector. It means that the CDMA signal for the AT is also very strong and can be used for voice service.

Finally, in the step S160, when CDMA pilot strength is above a hand-over threshold T_ADD, performing unit 3006 of network controller element 306 in EV-DO network switches AT/MS 40 into the base station 202. More specifically, if the pilot of CDMA is strong enough, AN 302 sends the 1X overhead messages to AT/MS 40 through CSNA protocol; and AN 302 sends the 1X service redirection message to AT/MS 40 through CSNA protocol. This will indicate the AT/MS 40 to begin the procedure to move the call from VoIP to 1X circuit voice. Then the MS/AT 40 sends the 1X origination to AN 302 through CSNA. And AN 302 sends the handoff direction message to MS/AT 40. Finally MS/AT 40 tunes to 1X channel to continue the call.

In the embodiments of the present invention, the EV-DO pilot transmitted by the CDMA base station 202 is included into the neighbor set of the border EV-DO AN 302, thus the reliable hand-over can be achieved by implementing EV-DO pilot measurement.

In another embodiment of the present invention, the base station 202 in the border of EV-DO may comprise a device 204 for generating EV-DO pilot signal.

Figure 4:
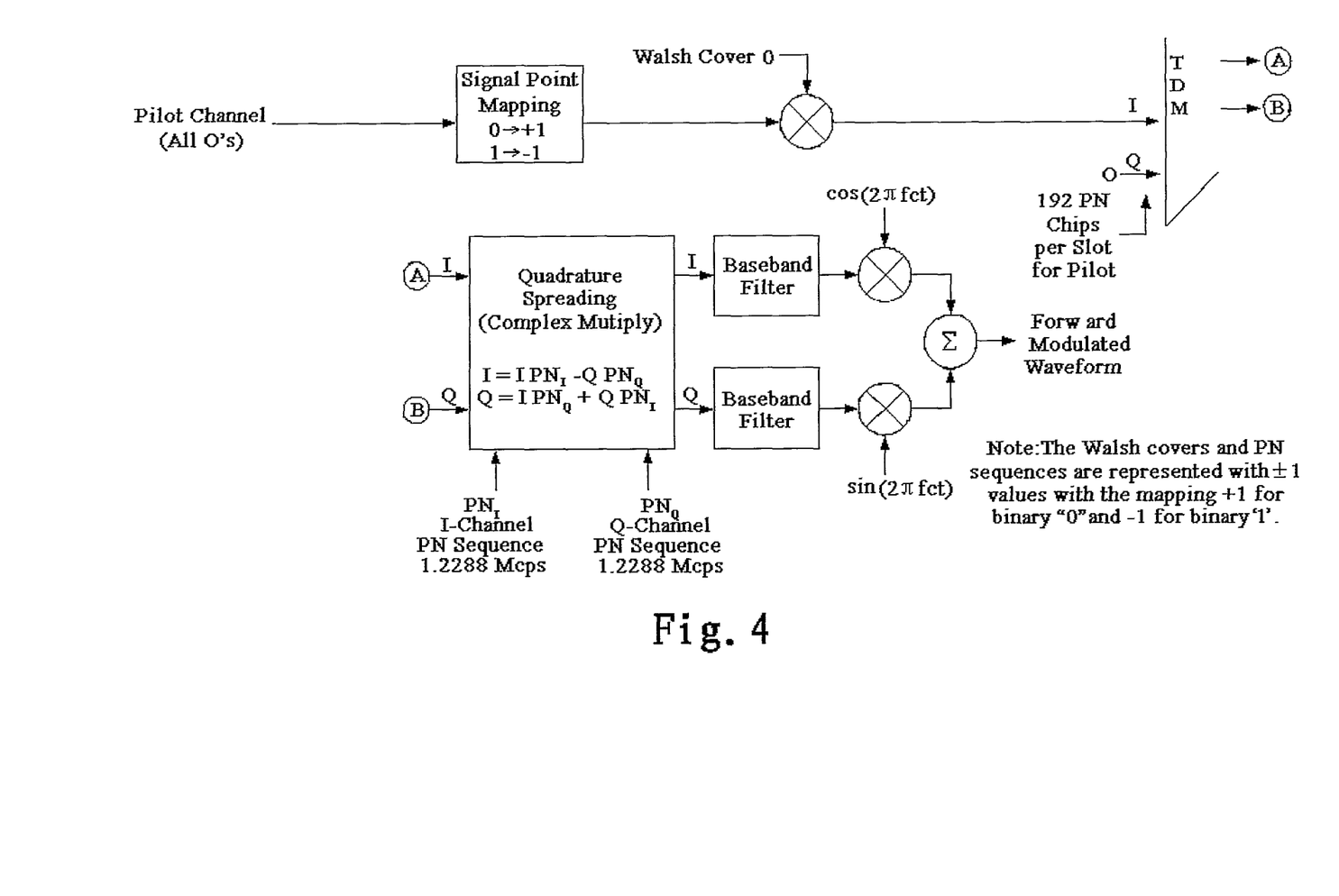
FIG. 4 shows a structure of EV-DO pilot channel in EV-DO system.

As shown in FIG. 4, the pilot channel of EV-DO system consists of all-'0' symbols transmitted on the I-channel with 16-chip Walsh cover 0 at a fixed chip rate of 1.2288 Mcps. And groups of 16 slots align to system time on even-second ticks.

Following orthogonal spreading, the pilot channel sequence is combined with other channel sequences such as Ack and data channel, to form resultant I-Channel and Q-Channel sequences, and these sequences are quadrature spread, which is equivalent to a complex multiply operation of the resultant I-Channel and resultant Q-Channel sequences by the I channel PN sequence PNi and Q channel PN sequence PNq with also a fixed chip rate of 1.2288 Mcps. And the characteristic polynomials of PN sequences PNi and PNq are also defined as follows:

$$P_I(x) = x^{15} + x^{10} + x^8 + x^7 + x^6 + x^2 + 1$$

(for the in-phase (I) sequence)
and $$P_Q(x) = x^{15} + x^{12} + x^{11} + x^{10} + x^9 + x^5 + x^4 + x^3 + 1$$

(for the quadrature-phase (Q) sequence).

In order to obtain the I and Q PN sequences (of period $2^{15}$), a '0' need be inserted after 14 consecutive '0' outputs (this occurs only once in each period). Therefore, the PN sequences PNi and PNq have one run of 15 consecutive '0' outputs instead of 14.

Referring to FIG. 4, following the quadrature spreading operation, the impulses of I and Q channels are applied to the inputs of the I and Q baseband filters respectively. Then it will form a forward pilot baseband signal by performing carrier modulation followed by being converted into analog signal, which can be combined to the transmit path of base station in CDMA system.

The EV-DO pilot signal is defined in C.S0024-A as follows:

the EV-DO pilot signal=(I−j*Q)*Walsh0*(PNi−j*PNq).

It can be known from FIG. 4 that the Walsh cover 0 is all 1, and I data is all 1, Q data is all 0, so EV-DO pilot signal=(PNi−j*PNq).

Figure 5:
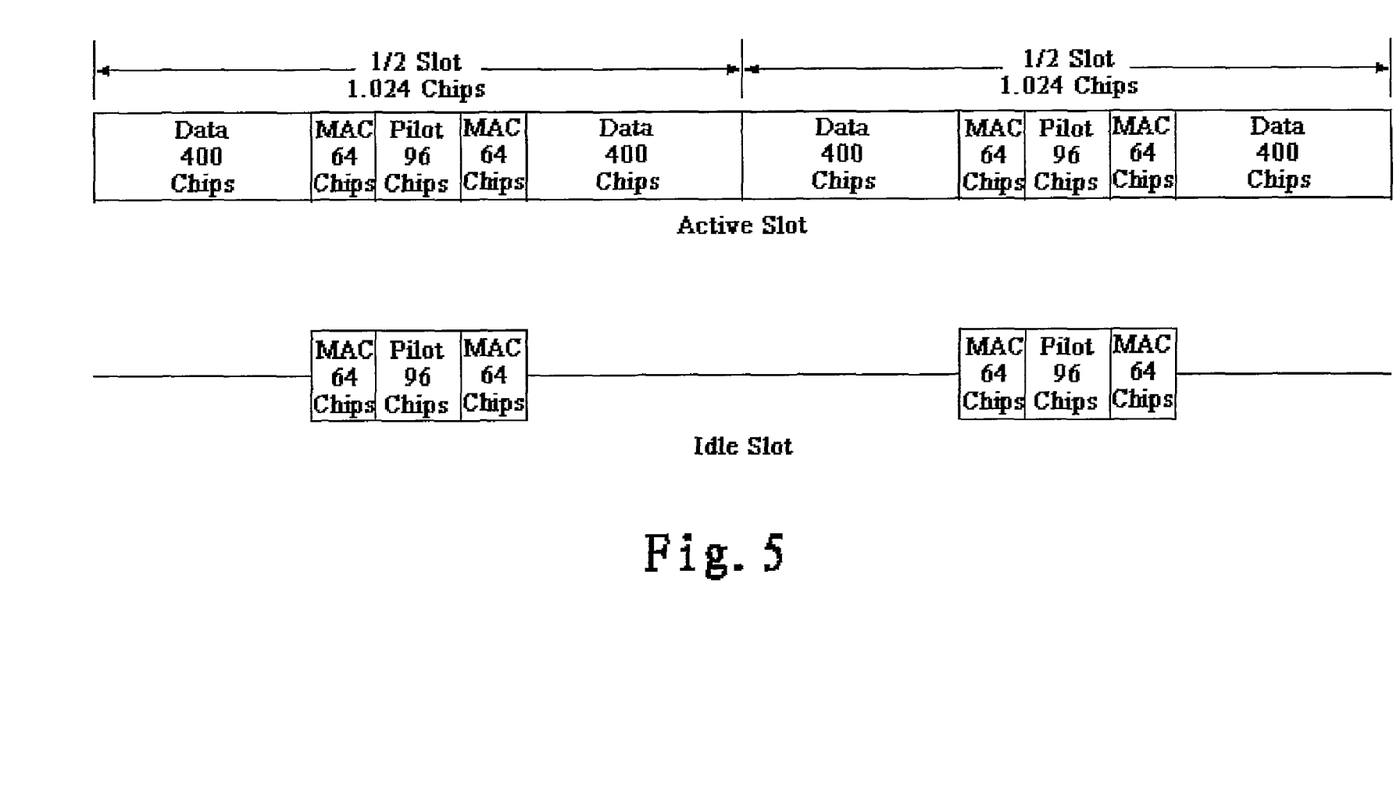
FIG. 5 shows a structure of EV-DO time slot.

Furthermore, within each slot, the pilot of EV-DO system is time division multiplexed with all the other forward link channels, such as MAC channel and data channel. As shown in FIG. 5, each pilot slot is divided into two half slots of 1024 chips, each of which contains a pilot burst. And each pilot burst has a duration of 96 chips and be centered at the midpoint of the half slot.

Figure 6:
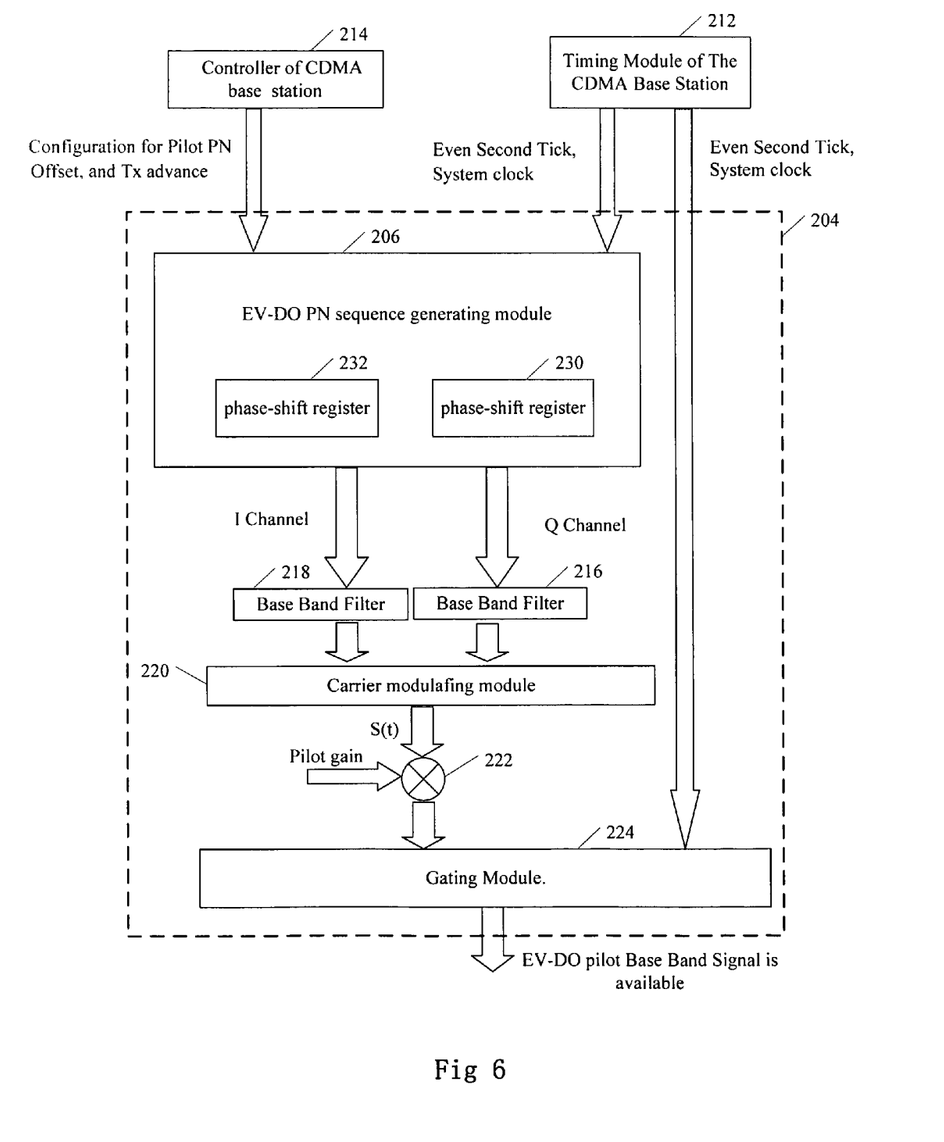
FIG. 6 shows a schematic block diagram of a device for generating EV-DO pilot in 1x system according to another embodiment of the present invention.

Referring to FIG. 6, the device 204 to implement above-described concept may include: EV-DO PN generating module 206 to generate PN sequences PNi and PNq for both I and Q channels respectively, in connection with Timing Module 212 of said second base station which provides Even Second Tick System clock to the generating module 206 and channel gating module 224, and with Controller 214 of said second base station which configures for Pilot PN Offset and time advance Tx; base band filter 216 and 218 which are individually configured to base band filter for I and Q PN sequences provided by generating module 206; carrier modulating module 220 configured to carrier modulate the I and Q channel PN sequences for obtaining real pilot signal S(t); and channel gating module 224 for generating 96 chips per 1024 chips within half slot, while the other chips being gated off.

The EV-DO PN generating module 206 comprises two phase-shift registers for PNi and PNq respectively.

Furthermore, the device 204 may further include multiplier 222, which multiplies the real signal S(t) with pilot gain for power control, and is connected to the input of the gating module 224.

Finally, the EV-DO pilot baseband signal can be available from the output of the gating module 224.

The EV-DO pilot channel can alignment with the system even second tick, and the CDMA base station has the same timing source. So the EV-DO pilot can be generated in the CDMA base station.

Figure 7:
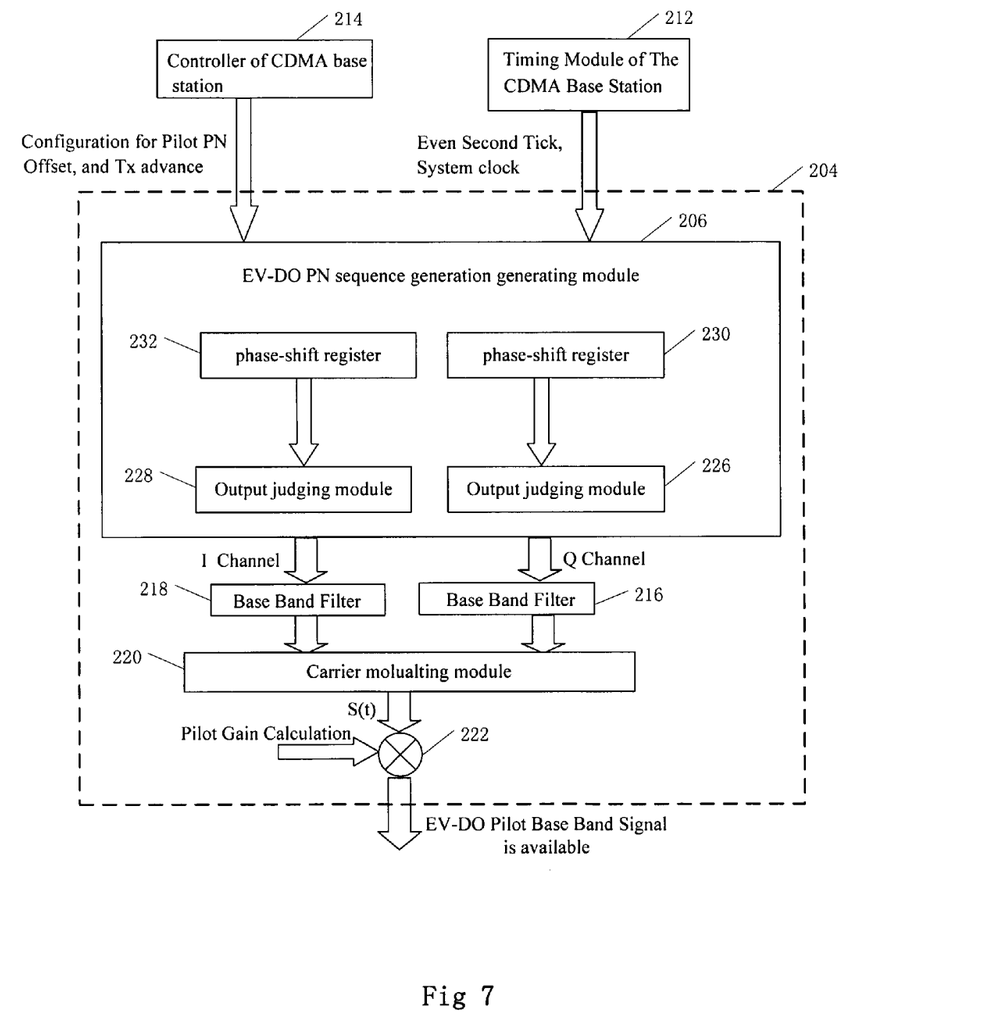
FIG. 7 shows a schematic block diagram of a device for generating EV-DO pilot in 1x system according to still another embodiment of the present invention.

Alternatively, as shown in FIG. 7, the device 204 may include EV-DO PN generating module 206 which comprises the output judging module 226 and 228 respectively for I and Q channel. The judging module 226 and 228 may judge the output for I and Q according to the system clock provided by timing module 212, thus the chip is outputted transparently in the pilot burst time frame while the remainder is outputted as "0". That is, only 96 chips of every 1024 chips (half slot) may be outputted.

Also, the output of generating module 206 for I and Q channel are connected to baseband filter 216 and 218 respectively, and by carrier modulating the real pilot signal can then be obtained.

Further, the device 204 may include the multiplier 222, which multiplies the real signal S(t) with pilot gain for power control.

Using the timing source in CDMA base station, the EV-DO pilot signal can be generated using the FPGA. It can be appreciated that the device for generating EV-DO pilot signal at CDMA base station can be implemented by hardware circuit such as Very Large Scale Integrated Circuit or gate array, semiconductor such as logic chips and transistors, or programmable hardware device such as field programmable gate array, programmable logic device, and by software executing on various types of processors, and by the combination of above hardware circuit and software.

As described above, the proposed method in the present invention can minimize the interference to the CDMA network.

Similar to concept of calculating in the communication system 10, assume the path loss of the EV-DO and CDMA combined cell is PL1, and the path loss of the CDMA only cell is PL2 with the CDMA carrier and EV-DO carrier having the same band.

If the transmit power for EV-DO is P Watts, then $$(Ec/Io)_{DO} = \frac{P*PL1}{P*PL1 + F*N_{th}*BW} \quad (8)$$

Here, the define of F, $N_{th}$, BW and Ec/Io is same as above. $F*N_{th}*BW$ is about −108.1 dBm if the noise figure of the cell is 5 dB, so it is relatively small. If the AT/MS is at the border of EV-DO cell, Ec/Io is about 0 dB from equation (8). Then the AT/MS can move away from the EV-DO cell. When the P*PL1 is near −108.1 dBm, the Ec/Io will decrease. Assume P is 42 dBm(16 W), then the PL1 is 155 dB when the Ec/Io is −6 dB. This path loss is at least 3 dB higher than the normal link budget. That is the reason why the AT/MS can maintain the EV-DO link far away from the normal coverage.

If the CDMA cell also transmits the EV-DO pilot signal, then the AT/MS will see a normal EV-DO coverage case. The pilot strength can be expressed mathematically as follows:

$$(Ec/Io)_{DO} = \frac{P*PL1}{P*PL1 + P*PL2 + F*N_{th}*BW};$$

Since the thermal noise is relatively small, so the EV-DO pilot strength can also be:

$$(Ec/Io)_{DO} = \frac{P*PL1}{P*PL1 + P*PL2}; \quad (9)$$

It is the normal EV-DO coverage scenario and the "Near-Far Interference" issue can be resolved.

While the method for hand-over of a terminal from a first base station to a second base station, network element, hybrid terminal, base station, the device for generating a pilot signal, and the communication system of the present invention have been described in detail with some exemplary embodiments, these embodiments are not exhaustive, and those skilled in the art may make various variations and modifications within the spirit and scope of the present invention. Therefore, the present invention is not limited to these embodiments; rather, the scope of the present invention is solely defined by the appended claims.

The invention claimed is:

1. A method for hand-over of a terminal from a first base station to a second base station, wherein said first base station is EV-DO enabled in an access network and said second base station is not EV-DO enabled, said method comprising:

transmitting an EV-DO pilot signal from said second base station which is not EV-DO enabled to said terminal;

sending a route update message including an EV-DO pilot strength from said terminal if said EV-DO pilot strength is above a predetermined threshold;

calculating a CDMA pilot strength based on said EV-DO pilot strength; and performing the hand-over of said terminal to said second base station when said CDMA pilot strength is above the hand-over threshold.

2. The method for hand-over of a terminal according to claim 1, further comprising:

maintaining a pilots mapping table including at least a pilot code of CDMA and a pilot code of EV-DO for each border cell.

3. The method for hand-over of a terminal according to claim 1, said pilot code comprises pseudo noise code.

4. The method for hand-over of a terminal according to claim 1, wherein said step of calculating CDMA pilot strength based on said EV-DO pilot strength comprises:

calculating CDMA pilot strength based on said EV-DO pilot strength and a ratio of a pilot power to overall power at antenna port in CDMA cell.

5. The method for hand-over of a terminal according to claim 4, wherein said ratio of a pilot power to overall power at antenna port in CDMA cell is defined as:

$$\frac{f*(P_{OH}+P_T)}{P_{OH}+\beta\max*P_T},$$

in which f is a ratio of a pilot power to a CDMA cell's maximum transmitter power, $P_{OH}$ is a power of overhead channel of the CDMA cell, $P_T$ is a total traffic power available for the CDMA cell, βmax is the maximum call load factor for the neighbor cells.

6. The method for hand-over of a terminal according to claim 1, said step of transmitting an EV-DO pilot signal comprises:
generating an EV-DO pilot signal at said second base station.

7. The method for hand-over of a terminal according to claim 6, said step of generating an EV-DO pilot signal comprises:
generating pseudo noise sequences of EV-DO for I and Q channel respectively based on an offset of pilot pseudo noise and transmitting time advance (Tx) provided by a controller of said second base station;
baseband filtering said PN sequences for I and Q channel respectively; and
Carrier modulating the PN baseband sequences for I and Q channel to obtain real signal from PN sequences for I and Q channel.

8. The method for hand-over of a terminal according to claim 7, said step of generating an EV-DO pilot signal further comprises:
gating said sequences for passing 96 chips of 1024 chips within half slot and setting the remainder 0 for I and Q channel respectively.

9. The method for hand-over of a terminal according to claim 7, said step of generating pseudo noise sequences uses two phase-shift registers for I and Q channels respectively.

10. The method for hand-over of a terminal according to claim , said step of generating pseudo noise sequences comprises:
judging the PN sequences for I and Q channel respectively based on system clock to output 96 chips of 1024 chips within half slot.

11. The method for hand-over of a terminal according to claim 7, said step of generating pseudo noise sequences comprises:
multiplying said real signal with pilot gain after the step of carrier modulating.

12. A network element for controlling hand-over from a first base station to a second base station, wherein said first base station is EV-DO enabled in an access network and said second base station is not EV-DO enabled, comprising:
calculating unit configured to calculate a CDMA pilot strength based on an EV-DO pilot strength of said second base station which is not EV-DO enabled;
determining unit configured to determine whether said CDMA pilot strength is above a hand-over threshold; and
performing unit configured to perform the hand-over of a terminal from said first base station to said second base station when said CDMA pilot strength is above the hand-over threshold.

13. The network element according to claim 12, further comprising:
maintaining unit configured to maintain a pilot mapping table including at least a pilot code of CDMA and a pilot code of EV-DO for each border cell.

14. The network element according to claim 13, said pilot code comprises pseudo noise code.

15. The network element according to claim 12, wherein said calculating unit calculates CDMA pilot strength based on said EV-DO pilot strength and a ratio of a pilot power to overall power at antenna port in CDMA cell.

16. The network element according to claim 15, wherein said ratio of a pilot power to overall power at antenna port in CDMA cell is defined as:

$$\frac{f*(P_{OH}+P_T)}{P_{OH}+\beta\max*P_T},$$

in which f is a ratio of a pilot power to a CDMA cell's maximum transmitter power, $P_{OH}$ is a power of overhead channel of the CDMA cell, $P_T$ is a total traffic power available for the CDMA cell, βmax is the maximum call load factor for neighbor cells.

17. A hybrid terminal for use in a CDMA system and an EV-DO system, wherein said hybrid terminal is configured to receive an EV-DO pilot signal from said CDMA system via a base station which in not EV-DO enabled.

18. A device for generating a pilot signal, which is to be equipped with a non-EV-DO enabled base station in a CDMA system, wherein said device is configured to generating a EV-DO pilot signal.

19. The device for generating a pilot signal according to claim 18, wherein said device comprises:
generating module configured to generate pseudo noise (PN) sequences of EV-DO for I and Q channel respectively based on an offset of pilot pseudo noise and transmitting time (Tx) advance provided by a controller of said second base station;
baseband filters individually configured to baseband filter the PN sequences for I or Q channel; and
Carrier modulating module configured to obtain real signal from PN sequences for I and Q channel.

20. The device for generating a pilot signal according to claim 19, wherein said device further comprises:
gating modules configured to gate said sequences for passing 96 chips of 1024 chips within half slot and setting the remainder 0 for I and Q channel respectively.

21. The device for generating a pilot signal according to claim 19, wherein said generating module comprises phase-shift registers for I and Q channel respectively.

22. The device for generating a pilot signal according to claim 19, wherein said device further comprises:
multiplier configured to multiply the real signal provided by said QPSK modulating module with pilot gain.

23. The device for generating a pilot signal according to claim 19, wherein said generating module comprises
output judging modules for I and Q channel respectively, configured to judge the PN sequences for I or Q based on system clock for outputting 96 chips of 1024 chips within half slot.

24. A device according to claim 18 implemented in a base station in a CDMA system, which is not EV-DO enabled.

25. A network element according to claim 12 implemented in a communication system comprising a hybrid terminal configured to receive an EV-DO pilot signal from a CDMA system and a base station in the CDMA system, which is not EV-DO.

* * * * *